Dec. 16, 1924.
F. A. MENARD ET AL
PEDAL HOLDER
Filed Oct. 31, 1923
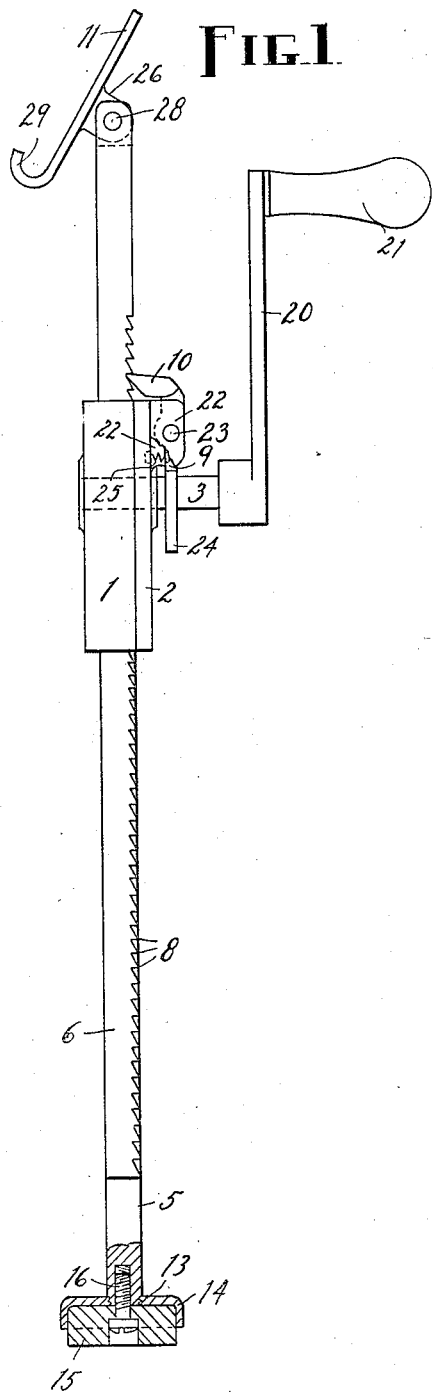
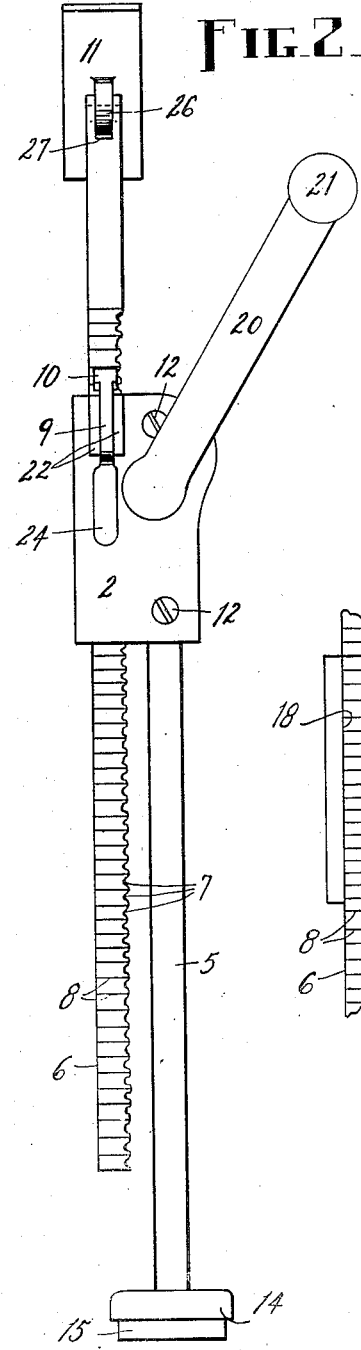
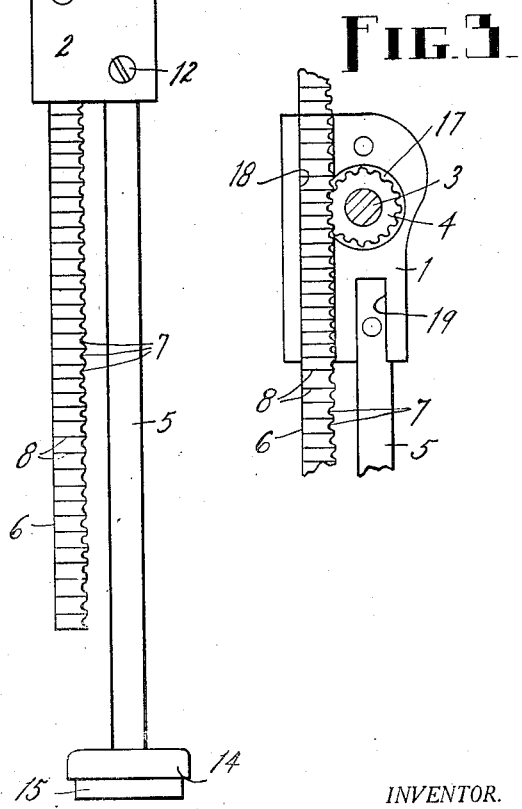
INVENTOR.
Edward A. Menard,
Lester Reed,
BY Frank A. Cutter,
ATTORNEY.

Patented Dec. 16, 1924.

1,519,793

UNITED STATES PATENT OFFICE.

EDWARD A. MENARD AND LESTER REED, OF SPRINGFIELD, MASSACHUSETTS.

PEDAL HOLDER.

Application filed October 31, 1923. Serial No. 671,927.

*To all whom it may concern:*

Be it known that we, EDWARD A. MENARD and LESTER REED, both citizens of the United States of America, and residents of Springfield, in the county of Hampden and State of Massachusetts, have invented a new and useful Pedal Holder, of which the following is a specification.

Our invention relates to improvements in devices for actuating forward and holding in forward position, pedals, more particularly brake pedals, of automobiles, and consists essentially of a body provided with a rigidly attached rod or bar which is cushioned at the outer end, a rod or bar arranged to slide in said body and having both rack teeth and ratchet-teeth, a crank-shaft journaled in said body and carrying a gear that intermeshes with said rack teeth, a latch or detent mounted on said body in position to engage said ratchet-teeth, and a pedal-engaging member pivotally connected with said second-named bar at the outer terminal thereof, all as hereinafter set forth.
Much difficulty is experienced in holding the brake pedal of an automobile in forward position while the brakes are being adjusted, when the work is done in the customary manner. It requires two persons, one to rock forward and hold the brake pedal, and the other to take up the brake bands, and frequently the person holding the pedal permits the same, after being properly set or fixed, to change position to a greater or less extent, with the result that the brakes are not adjusted alike. The primary objects of our invention are, therefore, to eliminate one person in the work of adjusting the brakes of an automobile, and to insure uniformity of adjustment. With this pedal holder, the brake pedal can be rocked forward to whatever extent may be required, and then held immovable throughout the adjusting operation, said holder being placed in active position by the person who does the adjusting.

Another object is to produce a comparatively simple and inexpensive, light yet strong and durable, and convenient device of the character described above.
Our pedal holder is capable of being used with the brake pedals of practically all makes of automobile except the Ford.

Other objects and advantages will appear in the course of the following description.

We attain the objects and secure the advantages of our invention by the means illustrated in the accompanying drawings, in which—

Figure 1 is a side elevation of a pedal holder which embodies a practical form of our invention, portions being broken away and in section; Fig. 2, a top plan of said holder, and, Fig. 3, a top plan of the body block of the holder without the cover, showing the parts and members hidden by said cover when the latter is in place, the crank-shaft being in cross section.

Similar reference characters designate similar parts throughout the several views.

Referring to the drawings, it will be seen that this pedal holder comprises a body consisting of a block 1 and a cover 2, a crank-shaft 3 journaled in said body, a gear 4 secured to said crank-shaft, a brace rod or bar 5 having one terminal secured to said body, a rod or bar 6 slidingly arranged in said body and having rack teeth 7 and ratchet-teeth 8, said rack teeth and the teeth on said gear intermeshing, a detent or latch 9 mounted on said body and having a head 10 to engage said ratchet-teeth, and a pedal-engaging plate 11 pivotally connected with the outer end of said second-named or serrated bar.

The cover 2 is on top of the block 1 and secured thereto by means of two screws 12 which pass downwardly through said cover to be tapped into said block. The block 1 is recessed at 19 to receive one terminal of the bar 5 in the manner clearly shown in Fig. 3, and one of the screws 12 passes through such terminal. Thus the rod 5 is securely attached to and rigidly connected with the body of the holder. The recess or slot 19 opens through the top and what is really the rear end of the block 1.

Inasmuch as what may properly be termed the rear end of the holder, which is the free end of the bar 5, is placed in the angle formed by the front of the driver's or operator's seat with the floor of the automobile, in practice, it is necessary to cushion such end in order to avoid marring, scratching, or otherwise injuring the finish of the parts with which said end comes into contact. We have, therefore, in the present example, provided the holder at the rear end with a cushion tip, such as that described below.

The bar 5, in the present example, is rectangular in cross section, and an externally screw-threaded nipple 13 is formed at the outer end of said bar to receive a shallow member or cup 14, the latter being centrally tapped to engage said nipple. A yielding or cushion member 15, of rubber or other suitable material, is fitted into the cup 14, and securely held therein by means of a screw 16 that has its head countersunk in said cushion and passes through said cushion into threaded engagement with the bar 5. In this manner a yielding or cushion tip is provided at the free or outer end of the bar 5.

A recess 17 is formed in the top of the block 1 to receive the gear 4, and said block is slotted at 18 to receive the bar 6, said recess opening into such slot and both opening through the top of the block. The slot 18 also opens through both ends of the block 1. Necessarily the rack teeth 7 are on the side of the bar 6 that is adjacent or contiguous to the gear 4, while the ratchet-teeth 8 are on top of said bar. Secured to the upper terminal of the crank-shaft 3 is a crank-arm 20 having at its outer terminal a handle 21. By grasping the handle 21 and rotating the crank-shaft 3, through the medium of the crank-arm 20, the gear 4 is rotated and imparts either a rearward (inward) or a forward (outward) movement to the bar 6, according to the direction in which the parts are rotated. The block 1 and the cover 2 both furnish bearings for the crank-shaft.

A pair of ears 22 rise from the cover 2, and the latch 9 is inserted between said ears and pivotally connected therewith at 23. The ears 22 at one end are flush with the forward end of the body, and the latch 9 extends beyond said end. The head 10 is at the forward end of the latch 9 and extends downwardly into engagement with the ratchet-teeth 8. The handle (24) of the latch 9 extends rearwardly over the cover 2. A spiral-spring 25 is interposed between the top of the cover 2 and a part of the latch that is behind the pivot 23, in position to elevate the handle 24 and depress the head 10, thereby retaining the latter in engagement with the ratchet-teeth 8, but enabling the same to yield when the bar 6 is actuated in the direction to cause said ratchet-teeth to snap past said head, the arrangement of said ratchet-teeth being such that this occurs when said rod is actuated outwardly or forwardly.

The pedal-engaging plate 11 is provided on top in the approximate center thereof with a lug 26, and said lug is received in a slot 27 in the outer or front terminal of the bar 6. The slot 27 opens through the top and bottom and outer end of the bar 6. The lug 26 is pivoted at 28 to the bifurcated terminal of the bar 6. The rear terminal of the plate 11 is bent downwardly and forwardly to form a hook 29. The plate 11 is designed to be placed on top of a brake pedal with the hook 29 beneath the under or rear edge of said pedal, whereby a sufficiently good engagement is made. The pivot 28 permits the plate 11 to rock as its position changes with the position of the pedal to which said plate is attached or with which it is engaged.

The operation of our pedal holder is described as follows:

The holder is placed in an automobile behind the brake pedal, with the cushion tip 15 bearing on the floor and against the front side of the operator's seat of said automobile, and with the plate 11 on said pedal, the lower or rear end of the pedal being in the hook 29 or engaged by said hook. In order thus to position the holder it may be necessary to rotate the crank either in the direction to retract or in the direction to advance the bar 6. Next the crank is rotated in the direction to advance the bar 6, and as said bar advances it rocks the brake pedal forwardly, through the medium of the plate 11 with its hook 29. As the bar 6 slides forwardly in the body, the ratchet-teeth 8 click past the head 10 of the latch 9. As soon as the brake pedal is actuated forwardly to the required extent the crank is released, when the bar 6 with the plate 11 and said pedal is held in place by one of the ratchet-teeth 8 and the latch 9. The operator, having thus adjusted and secured the brake pedal, leaves the holder and proceeds to adjust the brake bands. At the end of the brake-band adjusting operation the operator returns to the holder, rotates the crank in the direction to advance the bar 6 a sufficient distance to release the pressure on the latch head 10, presses downwardly on the latch handle 24 to disengage said head from the ratchet-teeth 8, and rotates said crank in the direction to retract said rod and permit the brake pedal to rock back into normal or initial position. The movement imparted at this time to the bar 6 is sufficient to enable the hook 29 to be disengaged from the pedal, and when this is done the holder is removed from the automobile.

Changes of minor importance may be made in some or all of the parts and members of this device, and changes in shape and size also may be made, without departing from the spirit of our invention or exceeding the scope of what is claimed.

We are aware that lifting jacks and other devices have been constructed wherein rack bars have been reciprocated through the medium of gears, and do not seek to claim such a device broadly.

What we do claim as our invention, and desire to secure by Letters Patent, is—

1. A pedal holder comprising relatively fixed and movable parallel connected bars, and means to reciprocate said movable bar, the latter being provided at its outer terminal with a pedal-engaging member, and said first bar being equipped at its outer end with a cushion tip.

2. A pedal holder comprising relatively fixed and movable parallel connected bars arranged side by side, said fixed bar being receivable at its outer end in the angle formed by the operator's seat with the floor of an automobile, means to reciprocate said movable bar, means normally to hold said last-named bar against movement in one direction, and a plate pivotally connected with said movable bar, said plate being bent downwardly at its rear end and adapted to engage the top and rear edge of a pedal.

3. A pedal holder comprising relatively fixed and movable parallel connected bars, said fixed bar having at its outer end a cushion tip receivable in the angle formed by the front of the operator's seat with the floor of an automobile, and said movable bar being provided at its outer terminal with a pivotally-connected pedal-engaging plate, and operating means for said movable bar.

4. A pedal holder comprising relatively fixed and movable parallel connected bars, said fixed bar having at its outer end a cushion tip receivable in the angle formed by the front of the operator's seat with the floor of an automobile, and said movable bar being provided at its outer terminal with a pivotally-connected pedal-engaging plate, operating means for said movable bar, and means to hold said last-named bar against movement in one direction.

5. A pedal holder comprising relatively fixed and movable parallel connected bars, said fixed bar having a cushion tip adapted to be receivable in the angle formed by the front of the operator's seat with the floor of an automobile, and said movable bar being provided at its outer terminal with a pivotally-connected plate bent downwardly at its rear end to engage the top and rear edge of the brake pedal of such automobile, and operating means for said movable bar.

6. In a pedal holder, a body provided with a fixed brace bar having at its outer end a cushion tip adapted to be received in the angle formed by the front of the operator's seat and the floor of an automobile, a crank having its shaft journaled in said body, a gear secured to said shaft, a latch mounted on said body, a serrated bar arranged to slide longitudinally in said body, said last-named bar having teeth for engagement with the teeth of said gear, and teeth adapted to be engaged by said latch, and a hook-provided plate pivotally connected with the outer terminal of said last-named bar, said plate being adapted to be engaged with the brake pedal of said automobile.

7. The combination, in a pedal holder, with a body comprising a slotted and recessed block and a cover secured thereto, said cover being provided with gears, a brace bar having one terminal inserted in one of the recesses in said block and secured in place therein, said bar being provided at its outer end with a cushion tip, a crank having its shaft journaled in said cover and block, a gear secured to said shaft in the other recess in said block, and a spring-pressed latch pivotally connected with said gears, of a bar arranged to slide in the slot in said block, said bar having rack teeth on one side in engagement with the teeth of said gear, and having ratchet-teeth on the top with which said latch engages, and a plate having a downwardly-extending hook at the rear end, and also having a lug on top, said lug being pivotally connected with the outer end of said last-named bar.

EDWARD A. MENARD.
LESTER REED.

Witnesses:
F. A. CUTTER,
CLIFTON C. WEST.